(12) United States Patent
Ueno (10) Patent No.: US 7,300,119 B2
(45) Date of Patent: Nov. 27, 2007

(54) RUBBER CRAWLER

(75) Inventor: Yoshio Ueno, Izumiohtsu (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 186 days.

(21) Appl. No.: 11/043,970

(22) Filed: Jan. 28, 2005

(65) Prior Publication Data

US 2005/0168069 A1 Aug. 4, 2005

(30) Foreign Application Priority Data

Feb. 4, 2004 (JP) .............................. 2004-028016

(51) Int. Cl.
*B62D 55/24* (2006.01)
(52) U.S. Cl. ..................... 305/165; 305/177; 305/182
(58) Field of Classification Search ................ 305/158, 305/165, 167, 171, 177, 178, 182, 183, 176
See application file for complete search history.

(56) References Cited

U.S. PATENT DOCUMENTS

| 2,786,725 | A | * | 3/1957 | Thome ........................ 305/181 |
| 4,145,092 | A | * | 3/1979 | Kasin ......................... 305/158 |
| 4,452,496 | A | * | 6/1984 | van der Lely ................. 305/15 |
| 4,681,377 | A | * | 7/1987 | Atkin et al. ................. 305/166 |
| 4,953,920 | A | * | 9/1990 | Jager ......................... 305/182 |
| 2002/0195876 | A1 | * | 12/2002 | Sakai ......................... 305/165 |
| 2004/0104620 | A1 | * | 6/2004 | Pringiers .................... 305/126 |

FOREIGN PATENT DOCUMENTS

| JP | 55-73481 A | 6/1980 |
| JP | 56-031878 A | 3/1981 |
| JP | 05-213239 A | 8/1993 |
| JP | 11-179731 A | 7/1999 |
| JP | 11-310170 A | 11/1999 |
| JP | 2000-177658 A | 6/2000 |
| JP | 2001-010559 A | 1/2001 |
| JP | 2001-038818 A | 2/2001 |
| JP | 2003-246283 A | 9/2003 |
| JP | 2003-327175 A | 11/2003 |

OTHER PUBLICATIONS

Notification of Reasons for Refusal (in Japanese Patent Application No. 2004-028016), Japanese Patent Office, Aug. 23, 2006. (2 pages).

* cited by examiner

*Primary Examiner*—Russell D. Stormer
(74) *Attorney, Agent, or Firm*—Birch, Stewart, Kolasch & Birch, LLP (57) ABSTRACT

The present invention relates to a rubber crawler including: a joint formed by joining together opposite ends of a crawler body comprising an elastic member shaped like a belt having the opposite ends; and lugs projected at predetermined space intervals along a longitudinal direction of the belt and arranged on an outer circumferential surface of the crawler body. The joint is disposed on the outer circumferential surface of the crawler body, as located in a ground non-engaging portion and at different positions with respect to the longitudinal direction of the belt, the ground non-engaging portion defining an area excluding the lugs. In this way, stress acting on the joint is distributed or reduced.

6 Claims, 12 Drawing Sheets

RUBBER CRAWLER

FIELD OF THE INVENTION

The present invention relates to an endless-belt rubber crawler for use in belted-track mobile apparatuses such as construction machines and agricultural machines.

DESCRIPTION OF THE PRIOR ART

The rubber crawler is used widely because it is more advantageous than an iron crawler in terms of lower noises, higher ride quality, better road-surface conservation characteristic and the like. While the rubber crawler includes a type wherein core bars are covered with rubber, a coreless type and the like, all those types are manufactured by forming rubber into an endless belt. Such an endless rubber belt may be formed by joining together opposite ends of a rubber belt cut in a certain length. As disclosed in Japanese Unexamined Patent Publication No. 2001-38818 (claim 1, FIG. 2), the joining of the opposite ends of the rubber belt is normally accomplished by curing an un-cured or semi-cured rubber belt with its opposite ends in butt connection. In some cases, the endless rubber belt may be formed by interconnecting a plurality of rubber belts, the respective ends of which are joined to each other.

An outer circumferential surface of the rubber crawler is formed with lugs as a ground-engaging portion, the lugs projected at predetermined space intervals along a longitudinal direction (circumferential direction) of the belt. A lug layout pattern includes a so-called stagger pattern, as disclosed in Japanese Unexamined Patent Publication No. 2000-177658 (FIG. 1, FIG. 4, FIG. 6), wherein the lugs are separated into left-hand and right-hand lug groups via a portion near a widthwise center of the rubber crawler and wherein a respective pair of the left-hand and right-hand lugs have their phases shifted from each other along the longitudinal direction of the belt.

OBJECT AND SUMMARY OF THE INVENTION

As described above, the rubber crawler having the endless belt shape has the following problem because of the inclusion of a joint at which the opposite ends of the rubber belt are joined together. That is, the crawler sustains cracks originating from the joint and growing therefrom, so that the crawler suffers a serious damage which results in a lowered durability of the crawler. Conventionally, the joint at which the opposite ends of the rubber belt is joined together to form the endless belt shape is disposed on the outer circumferential surface of the crawler as extended in a straight line substantially along a widthwise direction of the crawler. Therefore, the joint on the outer circumferential surface of the crawler encounters a serious stress concentration because the joint is subjected to stress which is not distributed along the longitudinal direction of the belt. Furthermore, the joint on the outer circumferential surface of the crawler is in the form of the straight line substantially along the widthwise direction of the crawler, so that the joint often cuts across the lug. Since the joint on a surface of such a lug or within such a lug is subjected to a greater stress associated with traction and the like, the joint is susceptible to interfacial separation and cracks. In addition, the cracks grow to cause a serious damage to the crawler. This results in the lowered durability of the crawler.

The invention is directed to the augmentation of the durability of the rubber crawler by distributing or reducing the stress on the joint thereby preventing the occurrence or growth of the cracks originating from the joint.

According to the invention for achieving the above object, a rubber crawler comprises: a joint formed by joining together opposite ends of a crawler body comprising an elastic member shaped like a belt having the opposite ends; and lugs projected at predetermined space intervals along a longitudinal direction of the belt and arranged on an outer circumferential surface of the crawler body, and is characterized in that the joint is disposed on the outer circumferential surface of the crawler body as located in a ground non-engaging portion and at different positions with respect to the longitudinal direction of the belt, the ground non-engaging portion defining an area excluding the lugs. According to this arrangement, the joint is not located at the lug which is subjected to the great stress associated with the traction (drive force) during a ground engaging operation, but at an outside surface of the ground non-engaging portion subjected to a relatively small stress. Accordingly, the joint is less susceptible to the cracks on its surface, while the growth of the cracks is suppressed. Furthermore, the joint is disposed on the outer circumferential surface of the crawler as located at different positions with respect to the longitudinal direction of the belt. Hence, the stress on the joint is distributed along the longitudinal direction of the belt.

According to a preferred aspect of the invention, the rubber crawler comprises: the lugs separated into left-hand and right-hand lug groups via a portion near a widthwise center of the crawler body or near a sprocket engagement hole, and staggeredly arranged in opposing relation; the crawler body including an outer circumferential member constituting the outer circumferential surface thereof, and an inner circumferential member disposed on an inner side of the outer circumferential member so as to constitute an inner circumferential surface of the crawler body; and the joint including an outer circumferential joint portion formed by joining together opposite ends of the outer circumferential member for forming an endless belt shape, and an inner circumferential joint portion formed by joining together opposite ends of the inner circumferential member for forming an endless belt shape, and is characterized in that the outer circumferential joint portion is located in the ground non-engaging portion whereas the inner circumferential joint portion is formed substantially along a widthwise direction of the crawler body. In this case, the lugs are staggered so that the left-hand and right-hand lugs are shifted from each other in phase. Therefore, time when the stress transmitted from a ground-engaging face is peaked differs between the left-hand lug and the right-hand lug. This prevents the great stress from acting on the left-hand and right-hand lugs simultaneously. Furthermore, the outer circumferential joint portion is located in the ground non-engaging portion, so that the positions thereof with respect to the lateral sides of an outer-circumferential ground-engaging portion are shifted from each other along the longitudinal direction of the belt as a result of that the outer circumferential joint portion circumvents the staggered lugs. This prevents the great stress from acting on the lateral sides of the outer-circumferential ground-engaging portion simultaneously. Furthermore, the outer circumferential joint portion, the lateral positions of which are shifted from each other along the longitudinal direction of the belt, is configured differently from the inner circumferential joint portion extended substantially along a widthwise direction of the crawler. This is effective to the distribute the stress on the joint.

According to another preferred aspect of the invention, the rubber crawler comprises: the lugs arranged along the longitudinal direction of the belt at a substantially equal pitch; and the outer circumferential joint portion, positions of which at widthwise opposite ends of the crawler are shifted from each other along the longitudinal direction of the belt by 0.2 or more times the pitch and 1.5 or less times the pitch.

In this case, the crawler may be formed uniformly with respect to the longitudinal direction of the belt by virtue of the lugs arranged at the substantially equal pitch. The widthwise opposite ends of the outer circumferential joint portion are shifted from each other along the longitudinal direction of the belt by 1.5 or less times the pitch and hence, the length of the outer circumferential joint portion is never greater than necessary. By the same reason, it is preferred that the widthwise opposite ends of the outer circumferential joint portion are shifted from each other along the longitudinal direction of the belt by 0.8 or less times the pitch. In addition, the widthwise opposite ends of the outer circumferential joint portion are shifted from each other along the longitudinal direction of the belt by 0.2 or more times the pitch, so that the phase shift of the lateral positions of the joint portion provides an adequate effect.

According to another preferred aspect of the invention, the rubber crawler comprises: widthwise reinforcing members embedded at space intervals along the longitudinal direction of the belt for the purpose of widthwise reinforcement of the crawler; and the inner circumferential joint portion located substantially centrally of the space between the widthwise reinforcing members.

In this case, the crawler is increased not only in the torsional rigidity thereof but also in the endurance against stress acting in the widthwise direction of the crawler. Although the elastic member has a relatively small thickness at its portion where the widthwise reinforcing members are embedded, the inner circumferential joint portion may be spaced away from the thin portion because the inner circumferential joint portion is located near the center of the space between the widthwise reinforcing members. Thus, the inner circumferential joint portion may achieve an increased joining strength.

The joint portion on the outer circumferential surface of the crawler body may include a portion inclined at 10° or more and 60° or less relative to the widthwise direction of the crawler body as seen in plan viewed from the outer circumferential surface of the crawler. In this case, the stress may be adequately distributed along the longitudinal direction of the belt by defining the angle of inclination to be 10° or more. In the meantime, the angle of inclination defined to be 60° or less affords the ease of locating the joint in the ground non-engaging portion defining the area excluding the lugs.

DESCRIPTION OF THE PREFERRED EMBODIMENTS

The preferred embodiments of the invention will hereinbelow be described with reference to the accompanying drawings.

Figure 1:
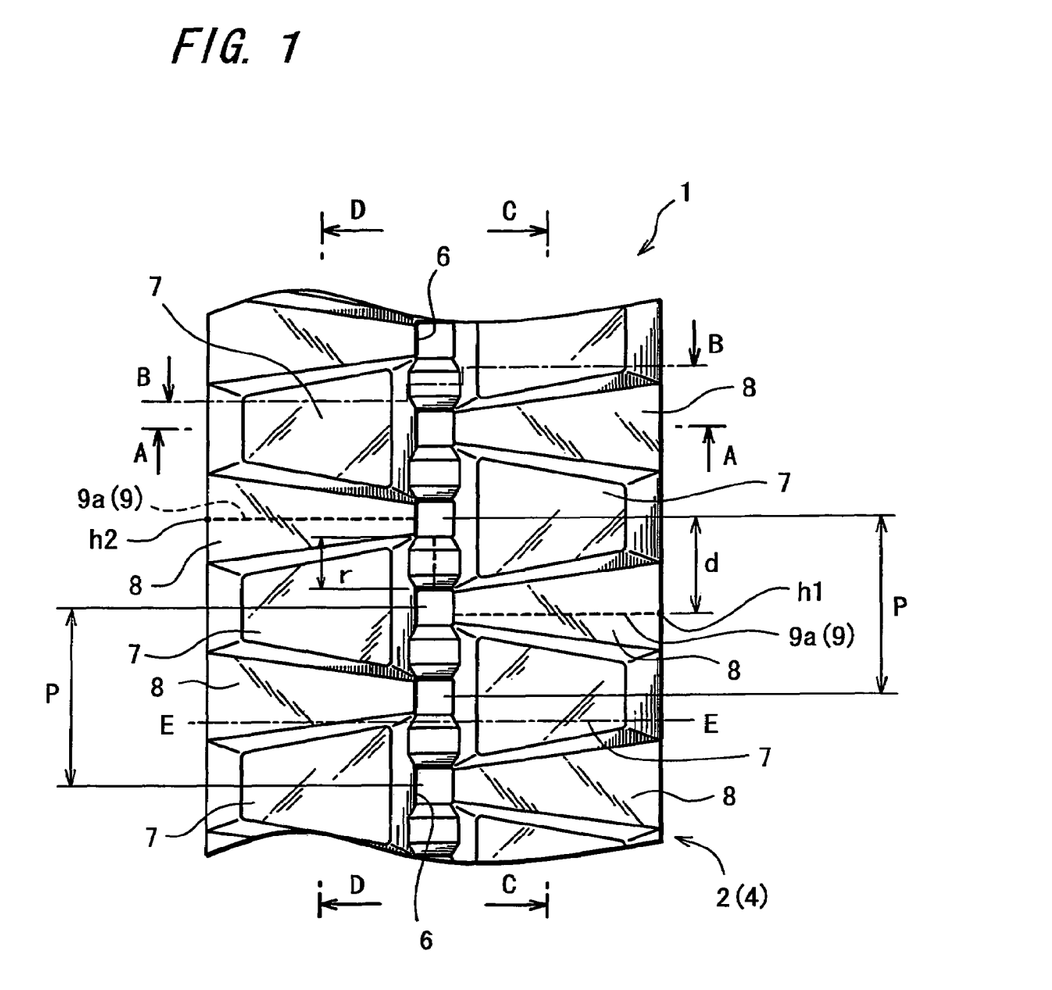
FIG. 1 is a plan view showing an outer circumferential surface of a crawler according to a first embodiment of the invention.
Figure 2:
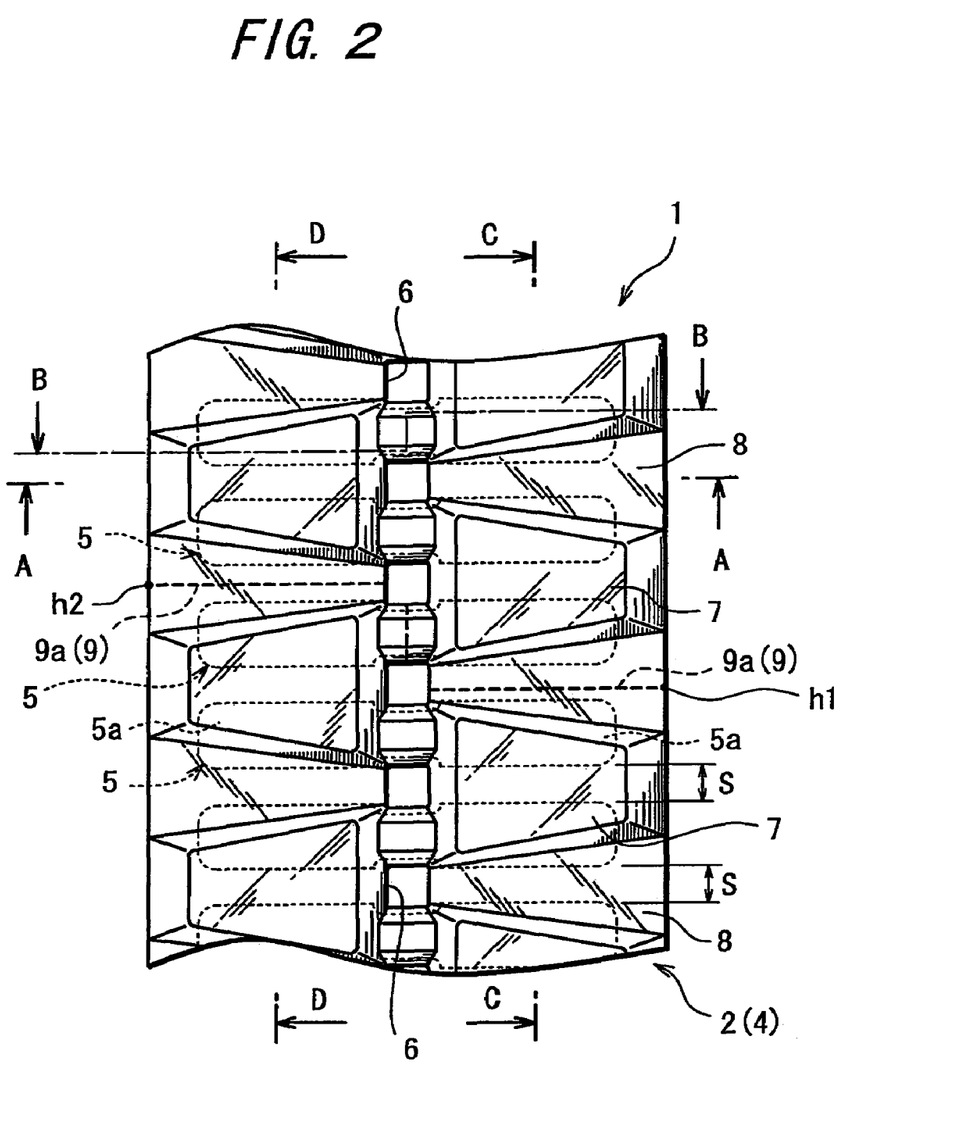
FIG. 2 is a plan view depicting core bars (widthwise reinforcing member) with broken lines which are added to FIG. 1.
Figure 3:
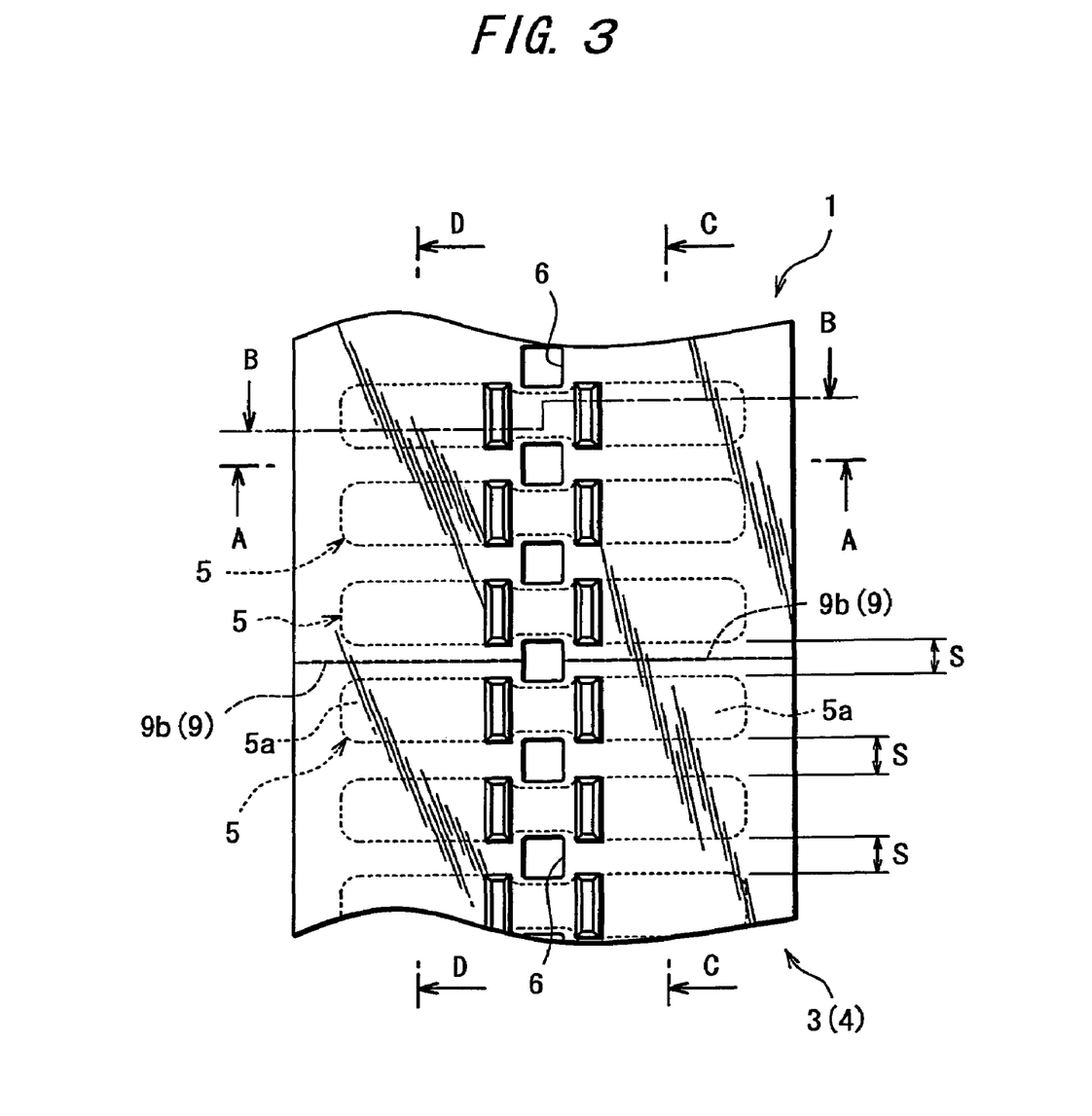
FIG. 3 is a plan view showing an inner circumferential surface of the rubber crawler according to the first embodiment of the invention.
Figure 4:
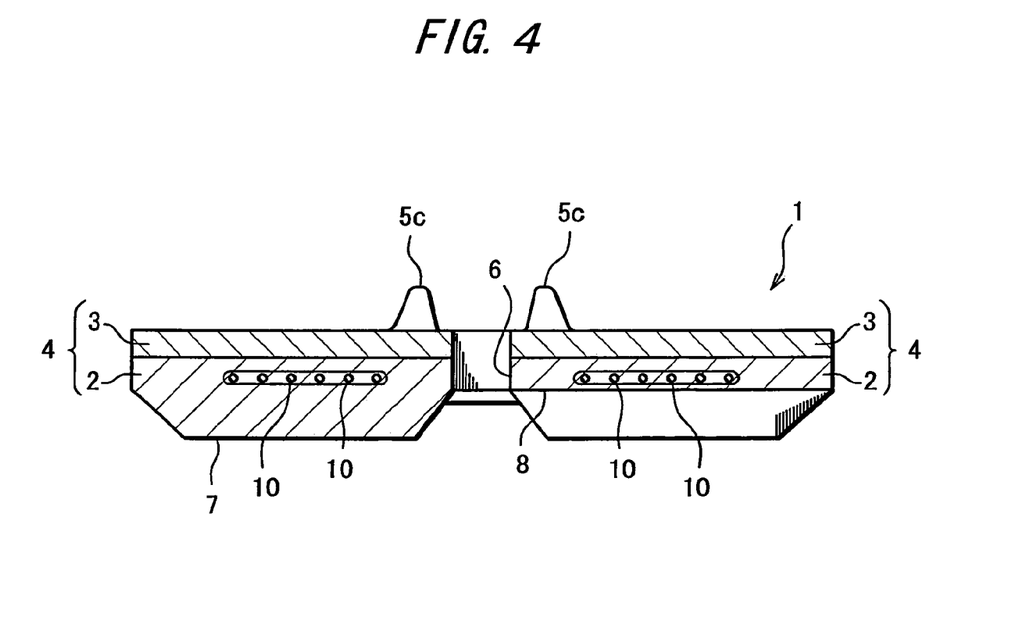
FIG. 4 is a sectional view taken on the line A-A in FIG. 1.
Figure 5:
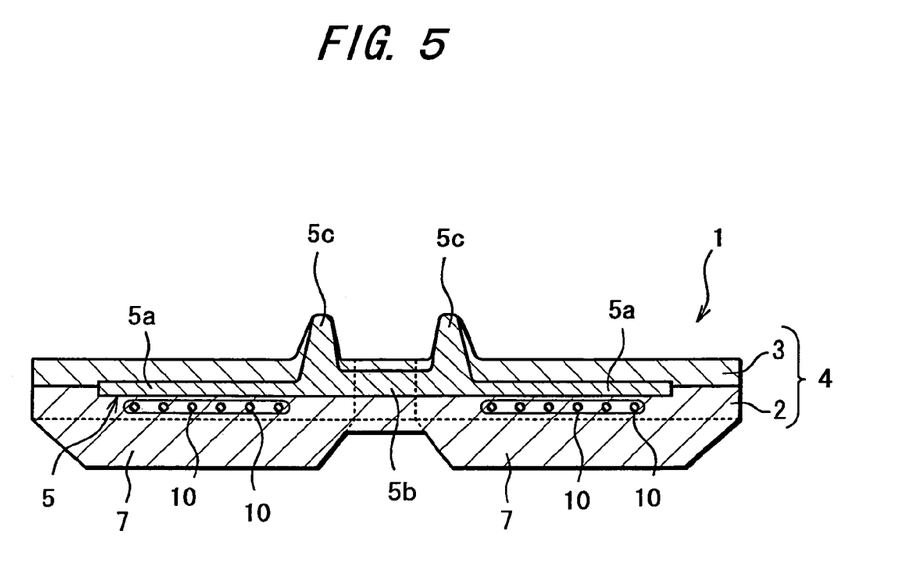
FIG. 5 is a sectional view taken on the line B-B in FIG. 1.
Figure 6:
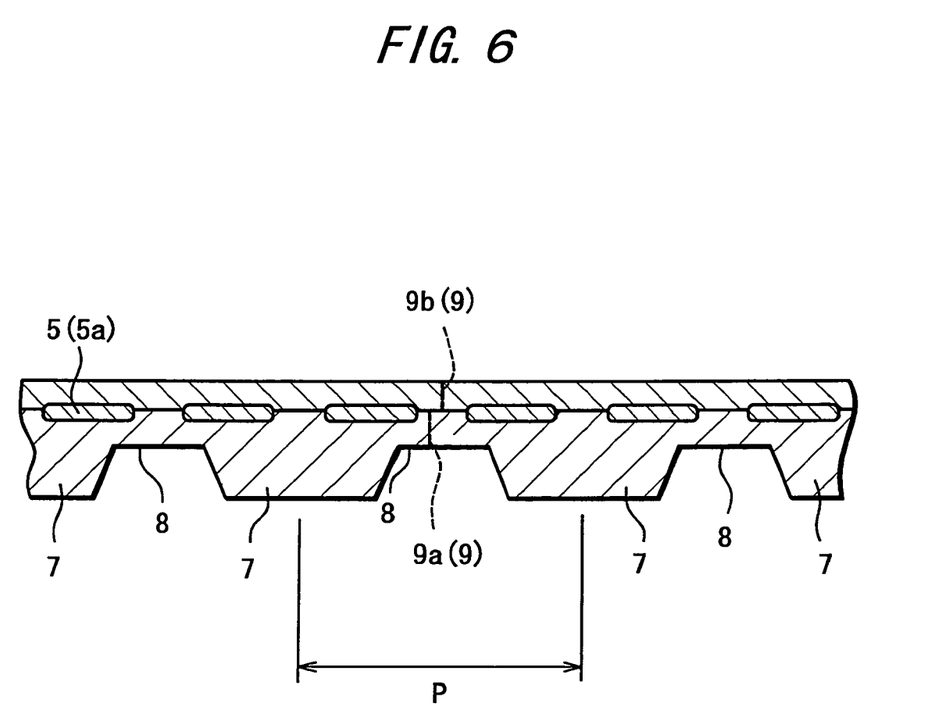
FIG. 6 is a sectional view taken on the line C-C in FIG. 1.
Figure 7:
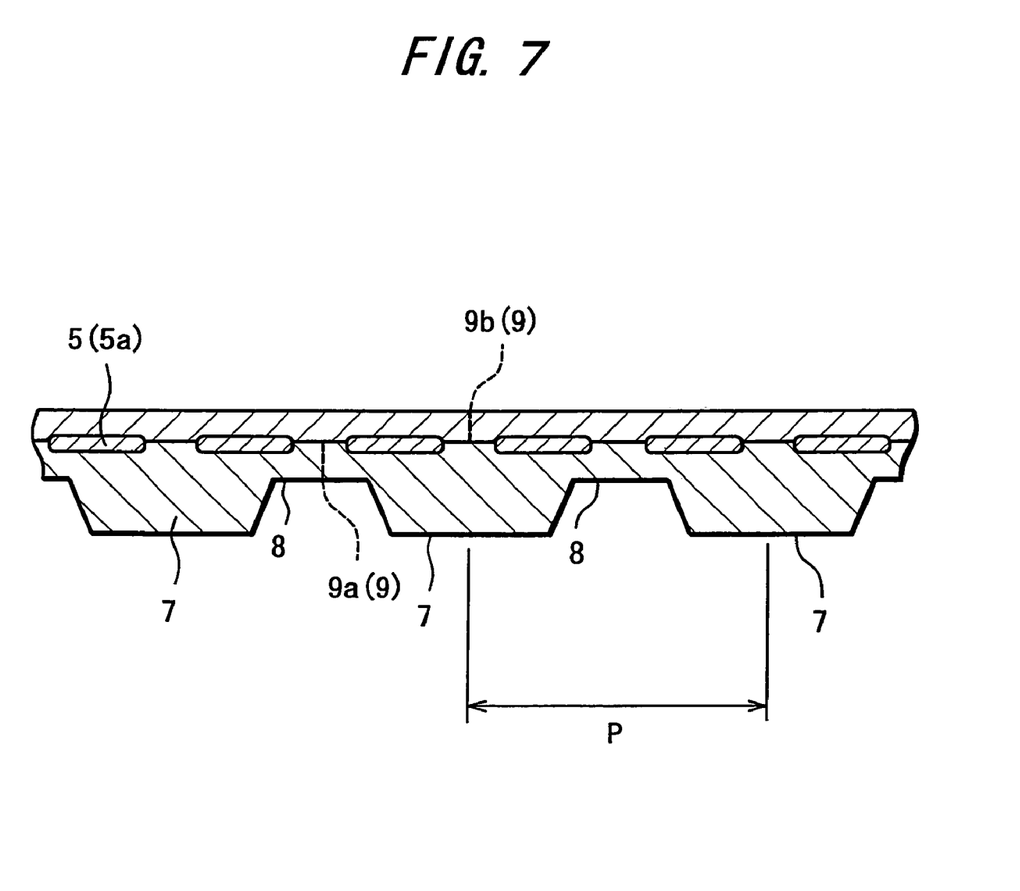
FIG. 7 is a sectional view taken on the line D-D in FIG. 1.

FIG. 1 is a plan view showing an outer circumferential surface (ground-engaging surface) of a rubber crawler 1 according to a first embodiment of the invention. FIG. 2 is a plan view depicting core bars as a widthwise reinforcing member with broken lines which are added to FIG. 1. FIG. 3 is a plan view showing an inner circumferential surface of the rubber crawler 1. FIG. 4 is a sectional view taken on the line A-A in FIG. 1 through FIG. 3. FIG. 5 is a sectional view taken on the line B-B in FIG. 1 through FIG. 3. FIG. 6 is a sectional view taken on the line C-C in FIG. 1 through FIG. 3. FIG. 7 is a sectional view taken on the line D-D in FIG. 1 through FIG. 3.

As shown in FIG. 1 and FIG. 2, the rubber crawler 1 includes: lugs 7, as ground-engaging portions, projected at predetermined space intervals along a longitudinal direction of belt; and a ground non-engaging portion 8 defining an area excluding the lugs 7. The lugs 7 are separated into left-hand and right-hand lug groups via a portion near a widthwise center of the rubber crawler 1, and are staggeredly arranged in opposing relation. As indicated by a broken line in FIG. 3, core bars 5 elongated in a widthwise direction of a crawler body 4 are embedded in the rubber crawler 1 at predetermined space intervals along the longitudinal direction of the belt. The core bars 5 serve as a widthwise reinforcing member for reinforcing the crawler body 4 in the widthwise direction thereof. FIG. 2 depicts the core bars 5 with the broken line which are added to the plan view of FIG. 1.

While the lugs 7 are separated into the left-hand and the right-hand lug groups via the portion near the widthwise center of the rubber crawler 1 and staggeredly arranged in opposing relation, as shown in FIG. 1, a respective pair of adjacent right-hand and left-hand lugs 7 are disposed in overlapping relation with respect to the longitudinal direction of the belt. In the rubber crawler 1, therefore, the lugs 7 are arranged such that a cross-section passing through any point on the longitudinal direction of the belt substantially along the widthwise direction of the crawler body cuts across at least a part of the lug. For instance, a cross-section taken on a widthwise line A-A with respect to the crawler body cuts across one (the left-hand lug 7 in FIG. 1) of the left-hand and right-hand lugs 7. Similarly, a cross-section taken on a widthwise line E-E with respect to the crawler body (see FIG. 1) cuts across both of the left-hand and right-hand lugs 7. If a straight-line joint extended along the widthwise direction of the crawler is to be provided on the outer circumferential surface of the crawler, as practiced in the prior art, the joint necessarily cuts across any part of the lug 7. According to the embodiment, a joint 9 (an outer-circumferential joint portion 9a to be described hereinlater) on the outer circumferential surface of the crawler is bent so that the lug 7 may not contain therein the joint 9. It is noted that "to cut across the lug" means not only to cut across a top face (ground-engaging face) of the lug 7 but also to cut across any part of the lug 7 (projected portion).

As shown in the sectional view of FIG. 4, the crawler body 4 of the rubber crawler 1 is constructed such that an outer circumferential member 2 and an inner circumferential member 3 are laminated, the outer circumferential member constituting the outer circumferential surface of the rubber crawler 1, the inner circumferential member 3 constituting the inner circumferential surface of the crawler body 4 as disposed on an inner side of the outer circumferential member 2. As shown in the sectional view of FIG. 5, the individual core bars 5 are embedded as sandwiched between the outer circumferential member 2 and the inner circumferential member 3.

As shown in FIG. 1 through FIG. 3, sprocket engagement holes 6 are formed centrally of the width of the rubber crawler 1 as arranged at regular space intervals along the longitudinal direction of the belt. A sprocket engages the sprocket engagement holes 6 thereby applying a drive force to the rubber crawler 1. The sprocket engagement hole 6 is a through hole extended from the outer circumferential surface to the inner circumferential surface of the rubber crawler 1. In some cases, a thin rubber film may be provided on an inside surface of the through hole. As shown in FIG. 2 and FIG. 3, the core bar 5 is embedded in space between a respective pair of adjoining sprocket engagement holes 6 with respect to the longitudinal direction of the belt. Thus, the core bars 5 are arranged longitudinally of the belt with equal spacing, while the crawler body 4 fills a space between a respective pair of adjoining core bars 5.

As shown in FIG. 5, the core bar 5 includes: lateral wings 5a individually extended transversely of the rubber crawler 1; a central portion 5b constituting a longitudinally central portion of the core bar 5; and anti-disengagement projections 5c individually projecting from laterally opposite sides of the central portion 5b toward the inner circumferential surface of the crawler. While the core bar 5 is embedded in the crawler body 4 of the rubber crawler 1, only the anti-disengagement projection 5c is partially exposed from the inner circumferential surface of the rubber crawler 1. As shown in FIG. 4 and FIG. 5, a plurality of tensioning members 10 such as formed of a steel cord are also embedded in the crawler body 4 along the longitudinal direction of the belt.

The rubber crawler 1 is formed into an endless belt by joining together opposite ends of the crawler body 4 formed from an elastic member shaped like a belt having the opposite ends. Therefore, the rubber crawler 1 includes the joint 9 at which the opposite ends of the crawler body are joined to each other. The crawler body 4 of the rubber crawler 1 includes the outer circumferential member 2 and the inner circumferential member 3, as described above, and each of the inner and outer circumferential members 2, 3 is formed into the endless belt by joining together the opposite ends of the belt member. Accordingly, the joint 9 includes the outer circumferential joint portion 9a formed by joining together the opposite ends of the outer circumferential member 2 for forming the endless belt shape; and an inner circumferential joint portion 9b formed by joining together the opposite ends of the inner circumferential member 3 for forming the endless belt shape. These joint portions 9 (the outer circumferential joint portion 9a, the inner circumferential joint portion 9b) are indicated by the broken lines in FIG. 1 through FIG. 3, FIG. 6 and FIG. 7.

As shown in FIG. 1, FIG. 6 and FIG. 7, the outer circumferential joint portion 9a does not exist in the lug 7 but exists in the ground non-engaging portion 8. Thus, the outer circumferential joint portion 9a of the joint 9 is disposed on the outer circumferential surface of the crawler body 4 as located in the ground non-engaging portion 8. More specifically, the outer circumferential joint portion 9a is divided into lateral segments via a portion near the widthwise center of the rubber crawler body 4, the lateral joint segments located at different positions with respect to the longitudinal direction of the belt. The lateral joint segments at the individually different longitudinal positions are extended substantially along the widthwise direction while the joint portion near the widthwise center is extended along the longitudinal direction of the belt.

In this manner, the outer circumferential joint portion 9a is located in the ground non-engaging portion 8 as circumventing the staggered lugs 7. Hence, the right-hand and the left-hand segments of the outer circumferential joint portion 9a are shifted from each other with respect to the longitudinal direction of the belt. On the other hand, the inner circumferential joint portion 9b is formed substantially in the straight line along the widthwise direction of the crawler body 4, as shown in FIG. 3. As a result, the outer circumferential joint portion 9a and the inner circumferential joint portion 9b have a positional relation with respect to the longitudinal direction of the belt such that the outer circumferential joint portion and the inner circumferential joint portion are close to each other on the right side of the rubber crawler 1 as seen in FIG. 1 (see the sectional view of FIG. 6 taken on the line C-C), whereas the outer and inner circumferential joint portions are spaced away from each other on the left side of the rubber crawler (see the sectional view of FIG. 7 taken on the line D-D).

In the rubber crawler 1, as shown in FIG. 1, the lugs 7 are arranged along the longitudinal direction of the belt at a substantially equal pitch P, whereas a distance d between widthwise opposite ends h1, h2 of the outer circumferential joint portion 9a with respect to the longitudinal direction of the belt is 0.2 or more times the pitch P and 0.8 or less times the pitch P.

While the rubber crawler 1 includes the core bars 5, as the widthwise reinforcing member for widthwise reinforcement, which are embedded therein at space intervals S along the longitudinal direction of the belt (see FIG. 3), as described above, the inner circumferential joint portion 9b is located substantially centrally of the space S, as shown in FIG. 3.

The rubber crawler 1 constructed in the aforementioned manner has the following working effects.

During a ground-engaging operation of the crawler, the lugs 7 receive a traction force (the drive force) as engaging the ground, so that the lugs 7 are subjected to a great stress. The rubber crawler 1 is constructed such that the joint 9 is disposed on the outer circumferential surface of the crawler body 4 as located on the surface of the ground non-engaging portion 8 which is subjected to a relatively smaller stress, rather than on the surface of the lug 7 or in the lug 7 which is subjected to a particularly great stress. Therefore, the rubber crawler is less susceptible to cracks originating from an outer circumferential surface of the joint 9. If the cracks should occur, the growth of the cracks will be suppressed. Furthermore, the joint portion has a smaller elongation at bent than the surface or interior of the lug 7 and hence, the joint portion is less likely to encounter the crack occurrence or the crack growth.

Furthermore, the outer circumferential joint portion 9a is disposed on widthwise opposite portions of the rubber crawler body 4 as located at the positions shifted from each other with respect to the longitudinal direction of the belt. Hence, the stress (such as tensile stress) acting on the outer circumferential joint portion 9a is distributed along the longitudinal direction of the belt. Accordingly, the stress concentration is alleviated so that the cracks originating from the outer circumferential joint portion 9a are obviated or that the crack growth is suppressed.

Since the lugs 7 are staggered with the left-hand and right-hand lugs mutually shifted in phase, time when the stress transmitted from the ground-engaging face is peaked differs between the left-hand lug and the right-hand lug. This prevents a great stress from acting on the left-hand and right-hand lugs simultaneously. Therefore, the outer circumferential joint portion 9 as a whole is prevented from receiving the great stress at a time. The outer circumferential joint portion 9a is located in the ground non-engaging portion 8 in a manner to circumvent the staggered lugs 7. Hence, the positions of the left-hand and right-hand segments of the outer circumferential joint portion 9a are shifted from each other along the longitudinal direction of the belt. This prevents the great stress from acting on the left-hand and right-hand segments of the outer circumferential joint portion 9a simultaneously. That is, the effect provided by the staggered the lugs 7 work synergistically with the effect provided by the outer circumferential joint portion 9a having the left-hand and right-hand segments thereof shifted from each other along the longitudinal direction of the belt, whereby the stress is distributed and the outer circumferential joint portion 9a is effectively prevented from suffering the occurrence or growth of the cracks.

The inner circumferential joint portion 9b is extended substantially in the straight line substantially along the widthwise direction of the crawler, whereas the outer circumferential joint portion 9a located in the ground non-engaging portion 8 between the staggered lugs 7 is extended in a non-straight line as seen in plan of FIG. 1. In the rubber crawler 1, therefore, the outer circumferential joint portion 9a and the inner circumferential joint portion 9b on the right-hand side of the width of the rubber crawler 1 are located close to each other with respect to the longitudinal direction of the belt, as shown in FIG. 6. However, the outer circumferential joint portion 9a and the inner circumferential joint portion 9b on the left-hand side of the width of the rubber crawler 1 are spaced away from each other with respect to the longitudinal direction of the belt, as shown in FIG. 7. Thus, the longitudinal positions of the outer circumferential joint portion 9a and the inner circumferential joint portion 9b with respect to the belt are shifted from each other at least on one of the right-hand side and the left-hand side of the width of the crawler. The all length of the outer circumferential joint portion 9a is not in proximity of the inner circumferential joint portion 9b with respect to the whole width of the crawler. Accordingly, the cracks produced in the outside surface of the outer circumferential joint portion 9a are less likely to grow to reach the inner circumferential joint portion 9b. This results in the augmented durability of the joint 9. Furthermore, the location of the joint 9 is distributed along the longitudinal direction of the belt, so that the stress on the joint 9 is effectively distributed. Accordingly, the cracks are less likely to occur while the growth of the cracks is suppressed.

In the rubber crawler 1, the lugs 7 are arranged along the longitudinal direction of the belt at the substantially equal pitch P. In this case, the crawler may be formed uniformly with respect to the longitudinal direction of the belt by virtue of the lugs 7 arranged along the longitudinal direction of the belt substantially with equal spacing. This results in a preferred crawler endlessly rotating in the longitudinal (circumferential) direction of the belt.

The outer circumferential joint portion 9a is designed such that the distance d between the longitudinal positions thereof at the widthwise opposite ends h1, h2 of the rubber crawler 1 is 1.5 or less times the pitch P (see FIG. 1). In this case, the length of the outer circumferential joint 9a with respect to the longitudinal direction of the belt is never greater than necessary. A specific description is made on this regard. As shown in FIG. 1, the lugs 7 are staggered in the rubber crawler 1, so that the left-hand and right-hand lugs 7 have different phases with respect to the longitudinal direction of the belt. Accordingly, the left-hand and right-hand ground non-engaging portions 8 also have different phases with respect to the longitudinal direction of the belt. The outer circumferential joint portion 9a is disposed at the left-hand and right-hand ground non-engaging portions 8 having the different phases. If the left-hand ground non-engaging portion 8 provided with the outer circumferential joint portion 9a is spaced too far away from the right-hand ground non-engaging portion 8 provided with the outer circumferential joint portion 9a, the outer circumferential joint portion 9a of the rubber crawler 1 has an excessively great longitudinal length r (see FIG. 1). For this reason, the aforesaid distance d is defined to be 1.5 or less times the pitch P. This prevents the outer circumferential joint portion 9a of the rubber crawler 1 from having the excessively great longitudinal length r (see FIG. 1) and hence, the outer circumferential joint portion 9a may achieve an increased joining strength. By the same reason as the above, the aforesaid distance d may more preferably be 0.8 or less times the pitch P.

On the other hand, the aforesaid distance d is also defined to be 0.2 or more times the pitch P, so that the left-hand and right-hand segments of the outer circumferential joint portion 9a having the different longitudinal positions with respect to the belt may fully exhibit the aforementioned effect.

The lugs 7 are staggered in the rubber crawler 1, so that the left-hand and right-hand lugs 7 have the mutually shifted phases with respect to the longitudinal direction of the belt and thence, the left-hand and right-hand ground non-engaging portions 8 also have the mutually shifted phases with respect to the longitudinal direction of the belt. Such a lug pattern may define the aforesaid distance d to be 0.2 or more times the pitch P and 1.5 or less times the pitch P, thereby providing the ease of locating the outer circumferential joint portion 9a only at the non-lug portions as circumventing the lugs.

On the other hand, the core bars 5, as the widthwise reinforcing member for the widthwise reinforcement of the crawler body 4, are embedded along the longitudinal direction of the belt at the space intervals S. Hence, the crawler body 4 is increased not only in the endurance against the stress acting in the widthwise direction thereof, but also in the torsional rigidity thereof.

In the rubber crawler 1, as shown in FIG. 3, the inner circumferential joint portion 9b is located substantially centrally of the space S. In this manner, the inner circumferential joint portion 9b is located substantially centrally of the space S where the elastic member has a relatively great thickness, rather than at a portion where the elastic member is decreased in thickness due to the core bar 5 embedded therein. Therefore, the inner circumferential joint portion may achieve the increased joining strength. Furthermore, the inner circumferential joint portion 9b may be spaced far away from the thin portion of the elastic member, so that the inner circumferential joint portion 9b is disposed at the portion of the elastic member that is relatively free to deform elastically. This results in a reduced stress on the inner circumferential joint portion 9b. In addition, a greater joining area is attained because the inner circumferential joint portion 9b is not located at the thin portion of the elastic member.

The inner circumferential joint potion 9b located substantially centrally of the space S is extended substantially along the widthwise direction, so that the whole length of the inner circumferential joint portion 9b between the right end thereof and the left end thereof is substantially at the same position with respect to the longitudinal direction of the belt. Accordingly, the inner circumferential joint portion 9b is configured differently from the outer circumferential joint portion 9a having the right and left ends located at different longitudinal positions with respect to the belt. At least on one of the right side and the left side of the crawler body 4 with respect to the widthwise direction, therefore, the longitudinal positions of the inner and outer circumferential joint portions with respect to the belt are not close to each other or spaced away from each other. As described above, the joint 9 is less susceptible to the cracks. If the cracks should occur, the growth of the cracks will be suppressed.

While the rubber crawler 1 is constructed such that the outer circumferential joint portion 9a is divided into the left-hand and right-hand segments via the portion near the widthwise center of the crawler body 4, the left-hand and right-hand segments individually extended substantially in parallel with the widthwise direction of the crawler body 4, the invention is not limited to this construction. Needless to say, the segments of the joint portion may be inclined relative to the widthwise direction of the crawler body 4, or may take any suitable configuration such as a curved line or a polygonal line.

Figure 8:
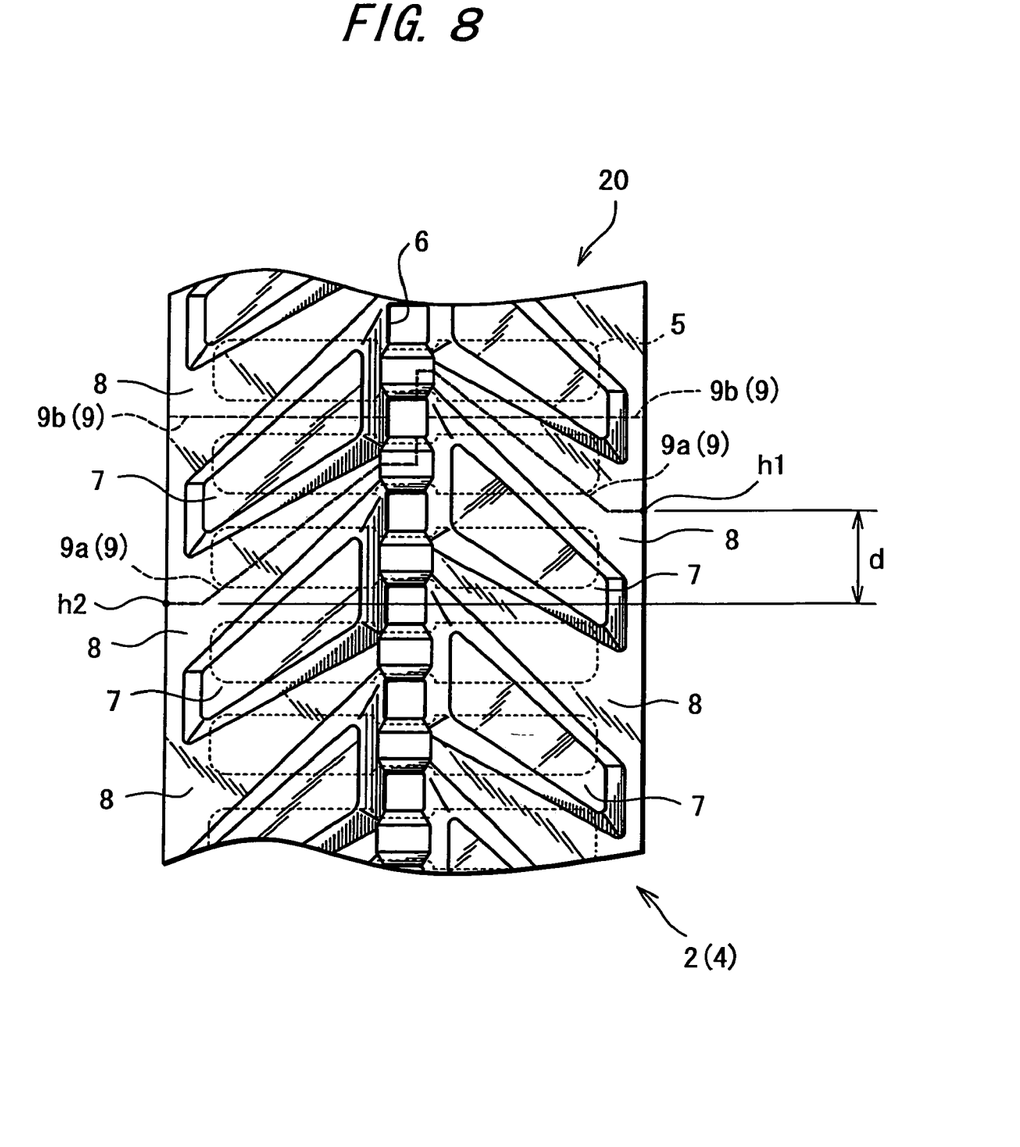
FIG. 8 is a plan view showing an outer circumferential surface of a rubber crawler according to another embodiment of the invention.

FIG. 8 is a plan view showing an outer circumferential surface (ground engaging surface) of a rubber crawler 20 according to a second embodiment of the invention. In the rubber crawler 20, the left-hand and right-hand lugs 7 are arranged in substantially an inverted V-fashion or inclined relative to the widthwise direction of the crawler body 4. On the outer circumferential surface of the rubber crawler 20, the outer circumferential joint portion 9a located in the ground non-engaging portion 8 is also inclined at their lateral segments but for the portion near the widthwise center of the crawler body 4, the inclination of the segments being substantially in conformity with the layout of the lugs 7. On the other hand, the inner circumferential joint portion 9b located on the inner circumferential surface, which is the back side as seen in FIG. 8, is formed substantially in the straight line along the widthwise direction of the rubber crawler 20. In addition, the inner circumferential joint portion is located substantially centrally of the space S between the core bars 5 embedded in the crawler body along the longitudinal direction of the belt at the space intervals S. Just as in the aforementioned rubber crawler 1, therefore, at least a part of the outer circumferential joint portion 9a is spaced away from the inner circumferential joint portion 9b with respect to the longitudinal direction of the belt. As described above, therefore, the joint 9 is less susceptible to cracks. If the cracks should occur, the growth of the cracks will be suppressed.

Figure 9:
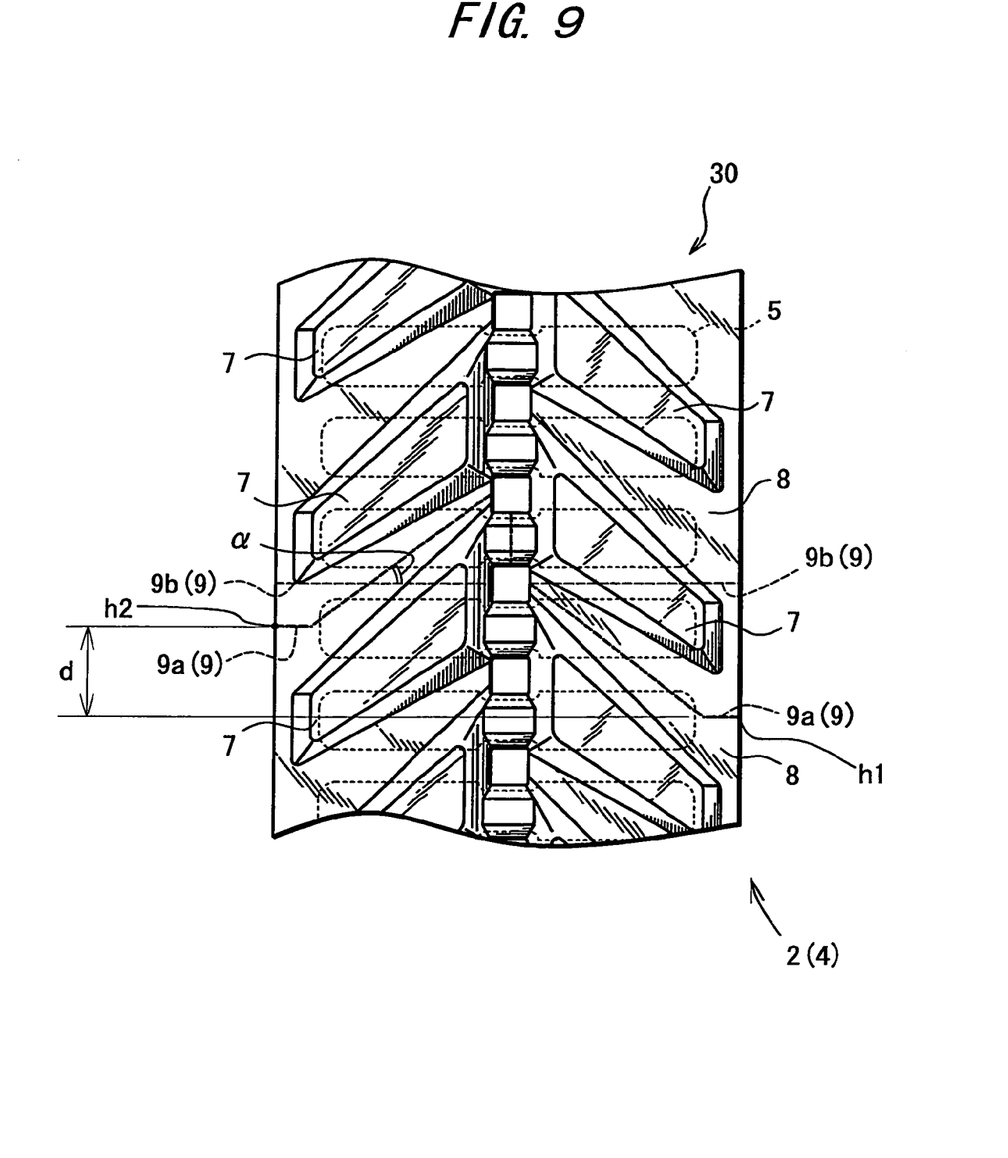
FIG. 9 is a plan view showing an outer circumferential surface of a rubber crawler according to another embodiment of the invention.

FIG. 9 is a plan view showing an outer circumferential surface of a rubber crawler 30 according to a third embodiment of the invention. The rubber crawler 30 has the same lug pattern as the rubber crawler 20, except for the layout of the outer circumferential joint portion 9a. That is, a difference between the rubber crawler 20 and the rubber crawler 30 consists in that the left-hand and right-hand segments of the outer circumferential joint portion 9a, as divided via the portion near the widthwise center of the crawler body 4, are at the longitudinal positions with respect to the longitudinal direction of the belt, which are defined in the opposite ways. It goes without saying that the rubber crawler 30 having such a construction provides the same working effects as the rubber crawler 20. In both of the rubber crawler 20 and the rubber crawler 30, the positions at the widthwise opposite ends h1, h2 of the outer circumferential joint portion 9a are shifted from each other along the longitudinal direction of the belt by the distance d which is 0.2 or more times the pitch P and 0.8 or less times the pitch P. As described above, therefore, the outer circumferential joint portion 9a may achieve the increased joining strength.

According to the embodiment shown in FIG. 9, the outer circumferential joint portion 9a, as the joint 9 on the outer circumferential surface, includes the segments inclined relative to the widthwise direction of the crawler body as seen in plan viewed from the outer circumferential surface of the crawler. The angle of inclination a is defined to be 10° or more and 60° or less relative to the widthwise direction of the crawler body 4 (such as represented by a broken line indicating the inner circumferential joint portion 9b in FIG. 9). The segments may be inclined at an angle of 10° or more, thereby adequately contributing to the aforementioned distribution of stress along the longitudinal direction of the belt. Furthermore, the segments inclined at an angle of 60° or less provides the ease of locating the joint in the ground non-engaging portion excluding the lugs. It is noted that the configuration of the segment inclined relative to the widthwise direction of the crawler body is not limited to the straight line and may also include a curved line. In this case, the aforesaid angle of inclination a may be determined from a tangent to the curved line.

Figure 10:
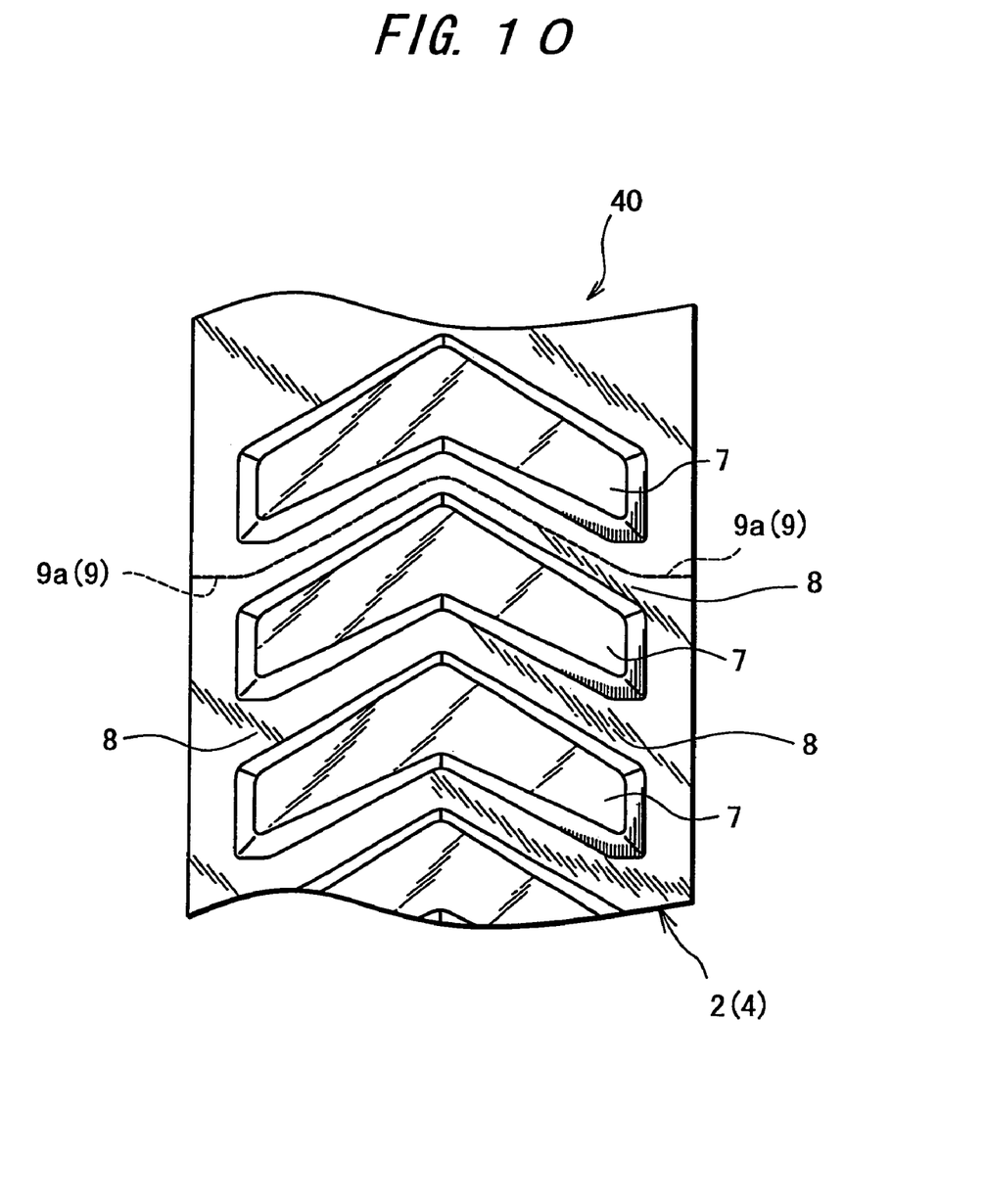
FIG. 10 is a plan view showing an outer circumferential surface of a rubber crawler according to another embodiment of the invention.
Figure 11:
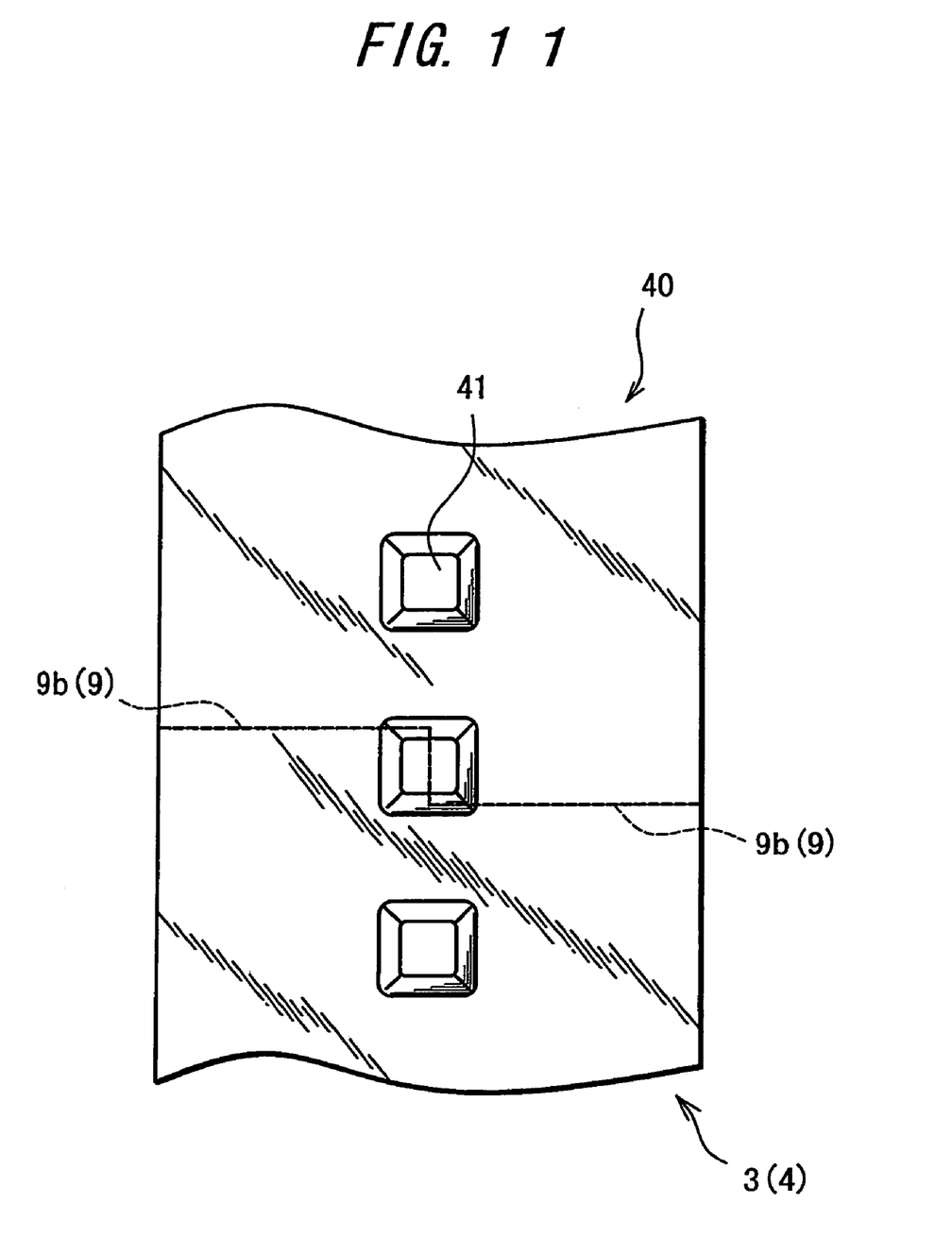
FIG. 11 is a plan view showing an inner circumferential surface of the rubber crawler shown in FIG. 10.

FIG. 10 is a plan view showing an outer circumferential surface of a rubber crawler 40 according to a fourth embodiment of the invention. FIG. 11 is a plan view showing an inner circumferential surface of the rubber crawler 40. Unlike the aforementioned rubber crawler 1 or the like, the rubber crawler 40 is of a so-called projection drive system, which does not include the sprocket engagement holes 6 but instead, includes driving rubber projections 41 on the inner circumferential surface. Furthermore, the rubber crawler 40 does not include the core bars 5. As shown in FIG. 10, the lug 7 is not separated into the left-hand and right-hand segments with respect to the widthwise direction of the crawler body 4. The lug 7 forms a substantially chevron-shaped pattern having a crest at place near the widthwise center of the crawler body 4 as seen in plan. The outer circumferential joint portion 9a is formed in conformity with the configuration of the lug 7, or substantially in a chevron shape as seen in plan. On the other hand, as shown in FIG. 11, the inner circumferential joint portion 9b includes: lateral segments which are shifted from each other in the longitudinal direction of the belt and are individually extended in straight lines along the widthwise direction of the crawler; and a central segment located centrally of the width of the crawler and extended along the longitudinal direction of the belt as interconnecting the lateral segments.

Such a rubber crawler 40 is adapted to reduce the stress on the joint 9 as described above, because the outer circumferential joint portion 9a is disposed on the outer circumferential surface of the rubber crawler 40 as located in the ground non-engaging portion 8. Furthermore, the outer circumferential joint portion 9a and the inner circumferential joint portion 9b have different configurations as seen in plan, so that the outer circumferential joint portion 9a and the inner circumferential joint portion 9b are spaced away from each other along the longitudinal direction of the belt at least somewhere along the widthwise direction of the crawler body 4. Accordingly, the occurrence of the cracks or the growth of the cracks is obviated as mentioned supra.

Figure 12:
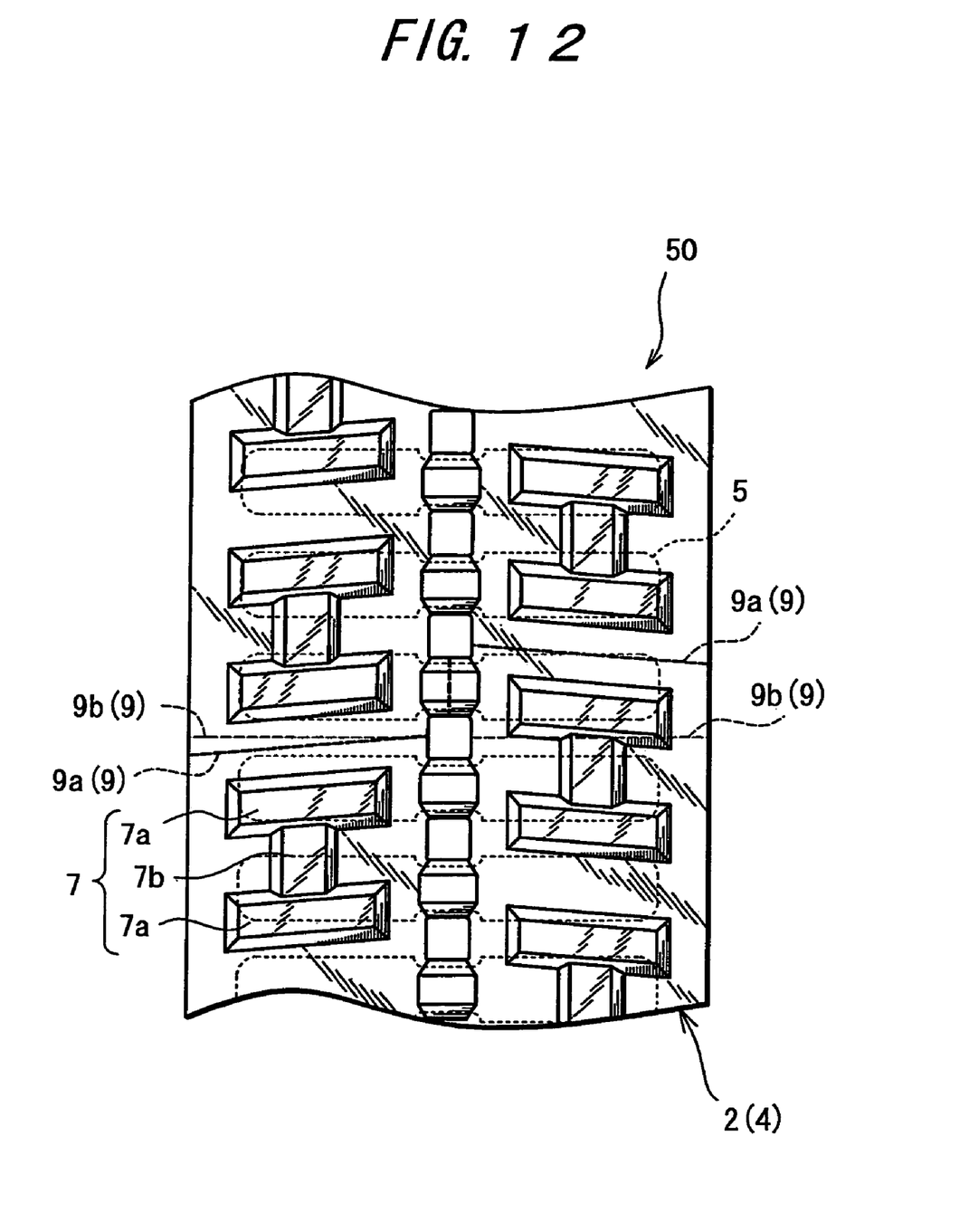
FIG. 12 is a plan view showing an outer circumferential surface of a rubber crawler according to another embodiment of the invention.

FIG. 12 is a plan view showing an outer circumferential surface of a rubber crawler 50 according to a fifth embodiment of the invention. In the rubber crawler 50, each of the lugs 7 includes a pair of transverse lugs 7a extended substantially along the widthwise direction of the crawler and in parallel relation; and an intermediate lug 7b extended substantially along the longitudinal direction of the crawler belt so as to interconnect the transverse lug pair 7a. A surface of the intermediate lug 7b is one step lower than that of the transverse lugs 7a and hence, the transverse lugs 7a principally engage the ground. The outer circumferential joint portion 9a is disposed on an outer circumferential surface of the rubber crawler 50 and is located in the ground non-engaging portion 8 as circumventing the transverse lugs 7a and the intermediate lug 7b. It goes without saying that the invention is also applicable to the rubber crawler having such a lug pattern.

What is claimed is:

1. A rubber crawler comprising:
    a joint formed by vulcanization joining together opposite ends of a crawler body comprising an elastic member shaped like a belt having the opposite ends; and
    lugs projected at predetermined spaced intervals along a longitudinal direction of the belt and arranged on an outer circumferential surface of said crawler body, wherein
        said crawler body includes (1) an outer circumferential member constituting the outer circumferential surface thereof (2) and an inner circumferential member disposed on an inner side of the outer circumferential member so as to constitute an inner circumferential surface of the crawler body;
        said joint includes (1) an outer circumferential joint portion formed by joining together opposite ends of said outer circumferential member for forming an endless belt shape and (2) an inner circumferential joint portion formed by joining together opposite ends of said inner circumferential member for forming an endless belt shape; and
        said outer circumferential joint portion is located in a ground non-engaging portion of the outer circumferential surface of said crawler body and at different positions with respect to the longitudinal direction of the belt, the ground non-engaging portion defining an area excluding said lugs.

2. A rubber crawler according to claim 1, wherein:
    said lugs are separated into left-hand and right-hand lug groups via a portion near a widthwise center of said crawler body or near a sprocket engagement hole and staggeredly arranged in opposing relation; and wherein
    said outer circumferential, joint portion is located in said ground non-engaging portion whereas said inner circumferential joint portion is formed substantially along a widthwise direction of said crawler body.

3. A rubber crawler according to claim 2, wherein:
    said lugs are arranged along the longitudinal direction of the belt at a substantially equal pitch; and
    said outer circumferential joint portion includes segments, positions of which at widthwise opposite ends of the crawler are shifted from each other along the longitudinal direction of the belt by 0.2 or more times said pitch and 1.5 or less times said pitch.

4. A rubber crawler according to claim 1, wherein said outer circumferential joint portion includes a portion inclined at 10° or more and 60° or less relative to a widthwise direction of the crawler body as seen in plan viewed from the outer circumferential surface of the crawler.

5. A rubber crawler according to claim 2, and further comprising:
    widthwise reinforcing members embedded at spaced intervals along the longitudinal direction of the belt for the purpose of widthwise reinforcement of the crawler body; and wherein
    said inner circumferential joint portion is located substantially centrally of the space between the widthwise reinforcing members.

6. A rubber crawler according to claim 3, wherein the positions of the segments are shifted from each other along the longitudinal direction of the belt by 0.2 or more times said pitch and 0.8 or less times said pitch.

* * * * *